United States Patent [19]

Takahashi et al.

[11] Patent Number: 5,178,809

[45] Date of Patent: Jan. 12, 1993

[54] PROCESS FOR PRODUCING SILICON NITRIDE SINTERED MATERIAL

[75] Inventors: Akira Takahashi, Chita; Keiichiro Watanabe, Nagoya, both of Japan

[73] Assignee: NGK Insulators, Lts., Japan

[21] Appl. No.: 717,538

[22] Filed: Jun. 19, 1991

[30] Foreign Application Priority Data

Jun. 29, 1990 [JP] Japan ................................. 2-172928

[51] Int. Cl.$^5$ ............................................. C04B 35/58
[52] U.S. Cl. ....................................... 264/65; 264/66; 501/92; 501/97
[58] Field of Search ...................... 501/92, 97; 264/66, 264/65

[56] References Cited

U.S. PATENT DOCUMENTS

| | | | |
|---|---|---|---|
| 4,264,548 | 4/1981 | Ezis | 264/66 X |
| 4,457,958 | 7/1984 | Lange et al. | 427/314 |
| 4,814,301 | 3/1989 | Steinmann et al. | 501/92 |
| 4,830,800 | 5/1989 | Thomas et al. | 264/66 X |
| 4,891,342 | 1/1990 | Yokoyama | 501/97 |
| 4,997,797 | 3/1991 | Hanzawa | 501/96 |

FOREIGN PATENT DOCUMENTS 0397464 11/1990 European Pat. Off. .

OTHER PUBLICATIONS

Patent Abstracts of Japan, vol. 014, No. 423 (C-757) Sep. 12, 1990 & JP-A-2 160 669 (Mitsubishi Gas Chem Co Inc), Jun. 20, 1990.

*Primary Examiner*—Mark L. Bell
*Assistant Examiner*—Lisa Schull
*Attorney, Agent, or Firm*—Parkhurst, Wendel & Rossi

[57] ABSTRACT

Powders of carbides are mixed with a silicon nitride powder and powders of rare earth element oxides to obtain a mixture. The mixture is shaped and fired in a casing in a nitrogen atmosphere of 1,700°–2,100° C. under the conditions specified by the following formula:

$$(0.025x - 0.05) < y \leqq 0.1x$$

wherein x is a firing time (hr) and y is the weight (g) of shaped material to be filled into casing divided by the internal volume (cc) of the casing.

6 Claims, 1 Drawing Sheet

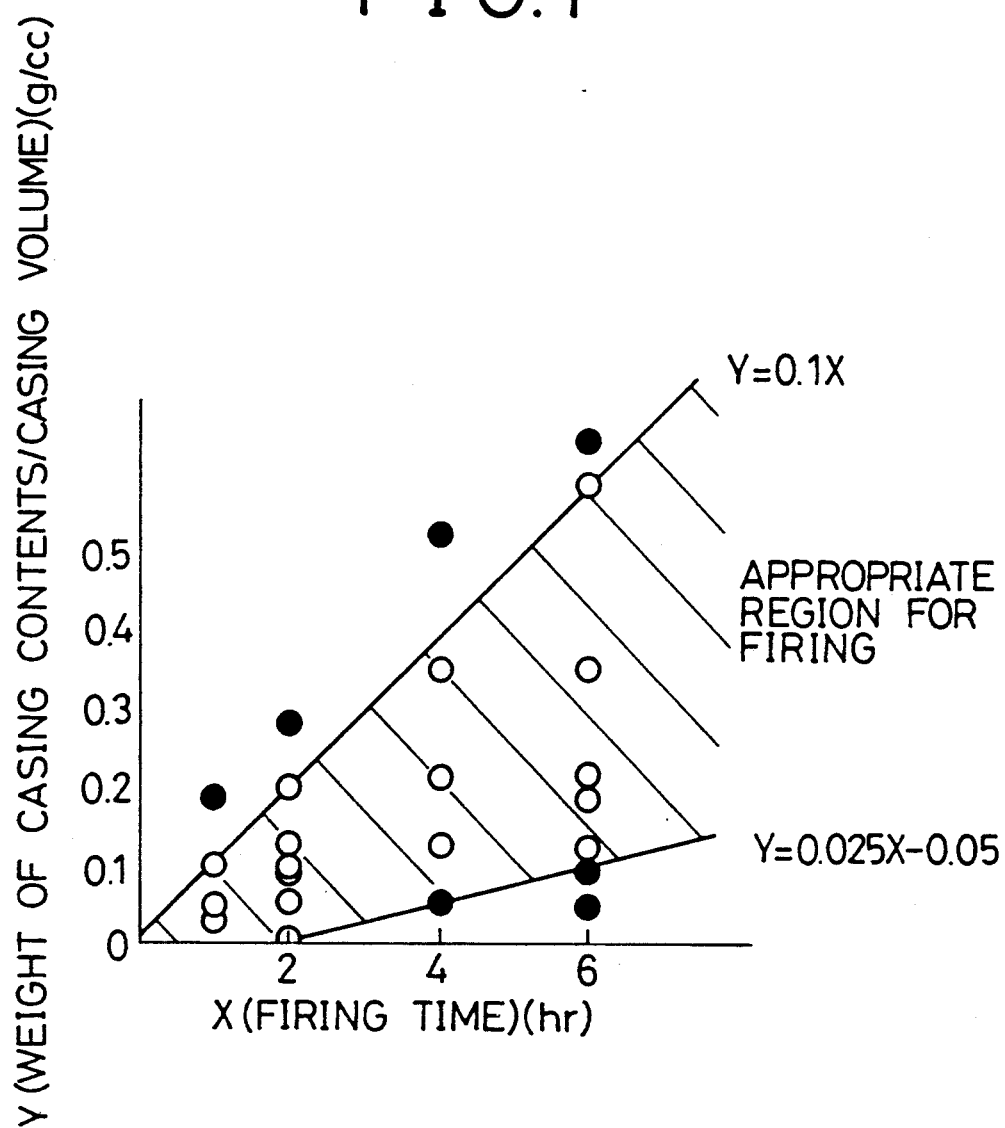

PROCESS FOR PRODUCING SILICON NITRIDE SINTERED MATERIAL

BACKGROUND OF THE INVENTION AND RELATED ART STATEMENT

The present invention relates to a process for producing a silicon nitride sintered material showing no strength deterioration at high temperatures.

With respect to silicon nitride sintered materials produced from raw materials containing oxides of IIIa group elements including rare earth elements, for example, Japanese Patent Publication No. 7486/1973 discloses a process for producing a sintered material, which comprises mixing 85 mole % or more of silicon nitride ($Si_3N_4$) with 15 mole % or less of at least one oxide selected from oxides of IIIa group elements, shaping the mixture, and sintering the shaped material in a non-oxidizing atmosphere. Also, Japanese Patent Publication No. 21091/1974 discloses a silicon nitride sintered material comprising 50% by weight or more of $Si_3N_4$, 50% by weight or less of at least one oxide selected from $Y_2O_3$ and oxides of La series elements and 0.01-20% by weight of $Al_2O_3$.

In these silicon nitride sintered materials, however, there were problems that no sintered material having a high strength at elevated temperature could be obtained by mere additions of rare earth elements to silicon nitride and that addition having a $Al_2O_3$ can give a high density but gives a grain boundary phase of low softening point and accordingly a significantly deteriorated high-temperature strength.

In order to solve the high-temperature strength problem, Japanese Patent Application Kokai (Laid-Open) No. 100067/1988 discloses a technique of adding, to a $Si_3N_4$ powder, rare earth elements of given composition and given amount and firing the mixture to obtain a silicon nitride sintered material having a specific crystalline phase and accordingly a high strength at elevated temperature.

The silicon nitride sintered material disclosed in Japanese Patent Application Kokai (Laid-Open) No. 100067/1988 can achieve a high strength at elevated temperature to some extent, but the high-temperature strength is lower than the room-temperature strength. This is presumed to be because the grain boundary is crystallized but, with the above composition, a vitreous phase still remains slightly in the grain boundary. In order to reduce the amount of the vitreous phase remaining in the grain boundary, there is considered an approach of adding rare earth element oxides to silicon nitride in large amounts relative to the amount of the total oxygen (expressed as $SiO_2$) present in the silicon nitride, to achieve a sintered material containing a vitreous phase in an amount as small as possible. In this approach, however, it is difficult to achieve a high density sintered material and.

Further, there was a problem that in firing a silicon nitride raw material in a casing, the amount of the shaped material to be filled into the casing is not specified and the properties of the sintered material obtained vary greatly depending upon the amount of the shaped material filled into the casing, even when the same firing conditions (e.g. temperature, time, pressure) are used.

The present inventors found that a silicon nitride sintered material showing no strength deterioration at high temperatures can be produced by using the technique disclosed in Japanese Patent Application Kokai (Laid-Open) No. 100067/1988 and by specifying firing conditions including the amount of shaped material to be filled into a casing. The finding has led to the completion of the present invention.

SUMMARY OF THE INVENTION

According to the present invention, there is provided a process for producing a silicon nitride sintered material, which comprises mixing raw materials consisting mainly of a silicon nitride powder, powders of rare earth element oxides and powders of carbides, shaping the resulting mixture to obtain a shaped material, and firing the shaped material in a casing in a nitrogen atmosphere of 1,700°-2,100° C. under the conditions specified by the following formula:

$$(0.025x - 0.05) < y \leq 0.1x$$

wherein x is a firing time (hr) and y is (weight (g) of shaped material to be filled into casing)/(internal volume (cc) of casing).

BRIEF DESCRIPTION OF THE DRAWING

FIG. 1 is a graph showing the relationship between (a) amount of shaped material to be filled into casing and (b) firing time.

DETAILED DESCRIPTION OF THE INVENTION

In the present invention, powders of carbides are mixed with a $Si_3N_4$ powder containing oxides of desired rare earth elements; the mixture is made into a shaped material; a specified amount of the shaped material is filled into a casing and fired therein in a nitrogen atmosphere to give rise to crystallization. Crystallization occurs in the cooling stage of the firing in some cases, or can be caused by reheating as necessary. In the latter case, the reheating is effected preferably at 1,000°-1,500° C. The above procedure can produce a sintered material containing carbides (e.g. SiC), in which material the grain boundary phase between $Si_3N_4$ grains is substantially a crystalline phase. This silicon nitride sintered material contains substantially no vitreous phase in the grain boundary and accordingly has a high strength even at high temperatures, which strength is about the same as the room-temperature strength thereof.

In the present invention, a shaped material is fired in a casing at 1,700°-2,100° C. under such conditions that (a) the amount of shaped material to be filled into casing and (b) the firing time satisfy the following formula:

$$(0.025x - 0.05) < y \leq 0.1x$$

wherein x is a firing time (hr) and y is (weight (g) of shaped material to be filled into casing)/(internal volume (cc) of casing), whereby a silicon nitride sintered material is obtained wherein the grain boundary phase between $Si_3N_4$ grains is substantially crystallized.

The range of y [(weight (g) of shaped material to be filled into casing)/(internal volume (cc) of casing)] under which the firing of the present invention is effected, is shown in FIG. 1 as the region between the slanted line.

The above ranges of x and y were discovered only after conducting numerous experiments. The change in amount of shaped material filled into the casing has a great influence on the properties of sintered material obtained, particularly its high-temperature strength. This is presumed to be because such change invites a change in atmosphere in the casing during firing, and consequently a change in composition, microstructure, etc. of the sintered material thus obtained.

Herein, the casing refers to a container for accomodating a shaped material during firing. The casing has no restriction as to its shape, material and necessity of cover as long as it can hold the firing atmosphere within the casing during firing.

It was confirmed by our experiments that when y [(weight (g) of shaped material to be filled into casing)/(internal volume (cc) of casing)] is outside the above range, the resulting sintered material has a deteriorated high-temperature strength.

Into the casing can be filled not only a shaped material but also a sintered material dummy for adjusting the weight of the casing inside.

The thus obtained sintered material is subjected to grinding, etc. to allow the sintered material to have a desired shape. Alternatively, and preferably the sintered material per se is subjected to a heat treatment at 1,000°-1,500° C. in air to form on the surface a surface layer of 5-100 μm consisting of rare earth element silicate oxides and silicate oxides.

In the present invention, the oxygen amount in the silicon nitride raw material is desirably 1-3% by weight. The oxygen amount can be controlled by oxidizing the silicon nitride raw material. Alternatively, a $SiO_2$ powder may be added.

The total amount of the rare earth element oxides is preferably 6-21% by weight. When the total amount is less than 6% by weight, no liquid phase sufficient for achieving a high density can be obtained. When the total amount is more than 21% by weight, it tends to be difficult to obtain a high density, sintered material even when carbides have been added. Use of rare earth elements other than $Y_2O_3$ and $Yb_2O_3$, such as $Lu_2O_3$, $Tm_2O_3$, $Er_2O_3$ and the like can give the same effect as $Y_2O_3$ and $Yb_2O_3$ do. The amount of each rare earth element in sintered material is the same as in the raw material mixture.

The amount of carbides added is preferably 0.1-11% by weight based on the total of silicon nitride and rare earth element oxides. When the amount is less than 0.1% by weight, no satisfactory density and crystallization can be obtained. When the amount is more than 11% by weight, the carbides hinder the achievement of high density in some cases. The amount of carbide(s) is more preferably 0.5-7% by weight. SiC as a carbide can be any of $\alpha$ type, $\beta$ type and amorphous type.

In the present process for producing a silicon nitride sintered material, there is firstly prepared a mixture of a silicon nitride powder, rare earth element oxides and carbides. The mixture is then made into a shaped material. Thereafter, the shaped material is filled into a casing in an amount specified above, and fired at a temperature of 1,700°-2,100° C., preferably 1,900°-2,000° C. for 1 hour in a nitrogen atmosphere having a pressure (nitrogen pressure: 1-200 atm) corresponding to the firing temperature, to effect crystallization. The silicon nitride sintered material of the present invention wherein the grain boundary phase between $Si_3N_4$ grains is sufficiently a crystalline phase.

The present invention is hereinafter described in more detail with reference to Examples. However, the present invention is in no way restricted to these Examples.

EXAMPLES 1-14, COMPARATIVE EXAMPLES 1-7

There were mixed 82.6% by weight of a silicon nitride raw material powder having a purity of 97% by weight, an oxygen content of 2.2% by weight, an average particle diameter of 0.6 μm and a BET specific surface area of 17 m$^2$/g, 17.4% by weight of rare earth element oxides ($Y_2O_3$/$Yb_2O_3$=3.4/14 wt. %) each having a purity of 99.9% by weight and an average particle diameter of 0.3-2.5 μm, and 1% by weight, based on the total of the silicon nitride raw material powder and the rare earth element oxides, of SiC having a purity of 99% by weight, an average particle diameter of 0.4 μm and a BET specific surface area of 20 m$^2$/g. Water resulting mixture and 100 kg (per 40 kg of the mixture) of pebbles made of a silicon nitride type ceramic were then added to the resulting mixture. These materials were subjected to grinding for 4 hours using a media agitating mill having an internal volume of 100 liters. Then the water was vaporized and the residue was granulated to prepare a shaping powder having an average particle diameter of 50 μm. Thereafter, the powder was subjected to isostatic pressing at a pressure of 7 ton/cm$^2$ to prepare a shaped material of 50×40×6 mm. The shaped material was filled into a casing in an amount shown in Table 1 and fired under the conditions shown in Table 1, to obtain silicon nitride sintered materials of Examples 1-14 according to the present invention. The same raw materials of the same amounts were ground, granulated and shaped in the same manner as above. The shaped material was filled into a casing in an amount shown in Table 1 and fired under the conditions shown in Table 1, to obtain silicon nitride sintered materials of Comparative Examples 1-7.

Each of these sintered materials was measured for bulk density, crystalline phase in grain boundary, and four-point flexural strengths at room temperature and 1,400° C. The results are shown in Table 1. In Table 1, bulk density of sintered material was measured in accordance with the Archimedes's method. Incidentally, it was expressed as a value relative to a theoretical density, in Table 1. This theoretical density was calculated from the composition and density of the raw materials mixture. The density of the mixture was calculated from $Si_3N_4$=3.2 g/cm$^3$, $Y_2O_3$=5.0 g/cm$^3$, $Yb_2O_3$=9.2 g/cm$^3$, $Tm_2O_3$=8.8 g/cm$^3$, $Lu_2O_3$=9.4 g/cm$^3$, $Er_2O_3$=8.6 g/cm$^3$, and SiC=3.2 g/cm$^3$. Four-Point flexural strength was measured in accordance with JIS R 1601 "Test Method for Flexural Strength (Modulus of Rupture) of High Performance Ceramics". Crystalline phase in grain boundary was determined from the results of X-ray diffraction by CuKα-rays. In Table 1, J is a cuspidine type crystal and gives the same diffraction pattern as $Si_3N_4.4Y_2O_3.SiO_2$ represented by JCPDS card 32-1451, wherein the crystallographic position of Y can be replaced by other rare earth elements. H is an apatite type crystal and gives the same diffraction pattern as $Si_3N_4.10Y_2O_3.9SiO_2$ represented by JCPDS card 30-1462, wherein the crystallographic position of Y can be replaced by other rare earth elements. K is a wollastonite type crystal and gives the same diffraction pattern as $2Y_2O_3.SiO_2.Si_3N_4$ represented by JCPDS card 31-1462, wherein the crystallographic position of Y can be replaced by other rare earth elements. L is a crystal represented by $Re_2SiO_5$ (Re: rare earth element)

and gives the same diffraction pattern as any of JCPDS cards 21-1456, 21-1458, 21-1461, 22-992 and 36-1476. S is a crystal represented by $Re_2SiO_7$ (Re: rare earth element) and gives the same diffraction pattern as any of JCPDS cards 20-1416, 21-1457, 21-1459, 21-1460, 22-994 and 22-1103.

ture was ground, granulated and shaped in the same manner as in Examples 1-14. The shaped material was filled into a casing in an amount shown in Table 2 and fired under the conditions shown in Table 2, to obtain silicon nitride sintered materials of Examples 15-24 of the present invention. Also, the same raw materials

TABLE 1

| | No. | Temperature × Time | Casing volume A (cc) | Weight B (g) | B/A (g/cc) | Relative density (%) | Four-point flexural strength (Mpa) $\sigma_{RT}$ | $\sigma_{1400}$ | Grain boundary crystalline phase in sintered material |
|---|---|---|---|---|---|---|---|---|---|
| Example | 1 | 1900° C. × 1 hr | 5400 | 270 | 0.05 | 98 | 760 | 740 | J > H > L |
| | 2 | 1900° C. × 1 hr | 2800 | 80 | 0.03 | 99 | 780 | 750 | J > H |
| | 3 | 1900° C. × 1 hr | 2800 | 270 | 0.10 | 98 | 750 | 740 | J > H |
| | 4 | 1900° C. × 2 hr | 5400 | 40 | 0.007 | 99 | 838 | 820 | J > H |
| | 5 | 1900° C. × 2 hr | 5400 | 540 | 0.10 | 97 | 800 | 709 | H > J > L |
| | 6 | 1900° C. × 2 hr | 5400 | 700*1 | 0.13 | 97 | 783 | 776 | H > J > L |
| | 7 | 1900° C. × 2 hr | 2800 | 560 | 0.20 | 96 | 720 | 705 | H > J > L |
| | 8 | 1900° C. × 4 hr | 5400 | 700 | 0.13 | 99 | 860 | 760 | J > H |
| | 9 | 1900° C. × 4 hr | 2800 | 620 | 0.22 | 99 | 850 | 750 | J > H |
| | 10 | 1900° C. × 4 hr | 2800 | 1000*2 | 0.36 | 98 | 838 | 838 | H > J > L |
| | 11 | 1900° C. × 6 hr | 5400 | 540 | 0.10 | 99 | 817 | 740 | J > H |
| | 12 | 1900° C. × 6 hr | 5400 | 1000 | 0.19 | 99 | 817 | 774 | J > H |
| | 13 | 1900° C. × 6 hr | 14000 | 5000*3 | 0.36 | 92 | 830 | 750 | J > H > L |
| | 14 | 1900° C. × 6 hr | 2800 | 1650 | 0.60 | 96 | 720 | 700 | J > H > L |
| Comparative Example | 1 | 1900° C. × 1 hr | 2800 | 540 | 0.19 | 93 | 700 | 560 | H > L > J |
| | 2 | 1900° C. × 2 hr | 2800 | 800 | 0.29 | 92 | 620 | 550 | H > L > J |
| | 3 | 1900° C. × 4 hr | 5400 | 270 | 0.05 | 99 | 495 | 430 | J > H |
| | 4 | 1900° C. × 4 hr | 2800 | 1470 | 0.53 | 95 | 650 | 640 | J > H |
| | 5 | 1900° C. × 6 hr | 5400 | 270 | 0.05 | 99 | 480 | 420 | J > H |
| | 6 | 1900° C. × 6 hr | 2800 | 270 | 0.096 | 99 | 590 | 540 | J > H |
| | 7 | 1900° C. × 6 hr | 2800 | 1830 | 0.65 | 92 | 600 | 490 | H > L > J |

Pressure at firing: 10 atm
*1 Consists of 270 g of a shaped material and 430 g of a sintered material dummy.
*2 Consists of 620 g of a shaped material and 380 g of a sintered material dummy.
*3 Consists of 2,000 g of a shaped material and 3,000 g of a sintered material dummy.

EXAMPLES 15-24, COMPARATIVE EXAMPLES 8-11

There were mixed, at proportions shown in Table 2, a silicon nitride raw material powder having the same properties as that used in Examples 1-14, rare earth element oxides each having a purity of 99.9% by weight and an average particle diameter of 0.3-2.5 μm, and carbides (SiC, WC and MoC) each having a purity of 99% by weight, an average particle diameter of 0.4 μm and a BET specific surface area of 20 m²/g. The mixture was mixed at the same proportions; the mixture was ground, granulated and shaped; the shaped material was filled into a casing in an amount shown in Table 2 and fired under the conditions shown in Table 2, to obtain sintered materials of Comparative Examples 8-11.

These sintered materials were measured for relative density, crystalline phase in grain boundary, and four-point flexural strengths at room temperature and 1,400° C., according to the same test methods as in Examples 1-14. The results are shown in Table 2.

TABLE 2

| | No. | Rare earth element oxides (wt %) | | | SiC (wt %)*3 | Other carbide (wt %)*3 | Firing conditions | | |
|---|---|---|---|---|---|---|---|---|---|
| | | $Y_2O_3$ | $Yb_2O_3$ | Other | | | Temp. (°C.) | Time (hr) | $N_2$ pressure (atm) |
| Example | 15 | 3.4 | 14 | | 1 | | 1900 | 4 | 10 |
| | 16 | 3.4 | 14 | | 7 | | 2000 | 2 | 100 |
| | 17 | 3.4 | 14 | | 3 | WC 2 | 1900 | 6 | 10 |
| | 18 | 2 | 9 | | 1 | | 1900 | 6 | 10 |
| | 19 | 2 | 9 | | 10 | | 1900 | 6 | 100 |
| | 20 | 3.8 | 15 | | 2 | | 1700 | 6 | 1 |
| | 21 | 3.8 | 15 | | 5 | MoC 3 | 1900 | 4 | 10 |
| | 22 | 3.4 | 0 | $Er_2O_3$ 12 | 1 | | 1900 | 4 | 10 |
| | 23 | 2 | 0 | $Tm_2O_3$ 10 | 3 | | 2100 | 2 | 100 |
| | 24 | 0 | 3.8 | $Lu_2O_3$ 12 | 7 | | 1880 | 6 | 10 |
| Comparative Example | 8 | 3.4 | 14 | | 1 | | 1900 | 2 | 10 |
| | 9 | 3.4 | 14 | | 10 | | 1900 | 4 | 10 |
| | 10 | 3.4 | 14 | | 1 | WC 3 | 1900 | 4 | 100 |
| | 11 | 3.4 | | $Er_2O_3$ 12 | 1 | | 1900 | 6 | 10 |

| | Casing volume | Weight | B/A | Relative density | Four-point flexural strength (MPa) | Grain boundary crystalline phase in sintered |

TABLE 2-continued

|  | No. | A (cc) | B (g) | (g/cc) | (%) | $\sigma_{RT}$ | $\sigma_{1400}$ | material |
|---|---|---|---|---|---|---|---|---|
| Example | 15 | 2800 | 560 | 0.2 | 99 | 850 | 750 | J > H |
|  | 16 | 2800 | 420 | 0.15 | 95 | 800 | 760 | J > H |
|  | 17 | 2800 | 780 | 0.28 | 98 | 900 | 830 | J > H |
|  | 18 | 5400 | 1620 | 0.3 | 99*1 | 820*1 | 810*1 | H*1 |
|  | 19 | 5400 | 1080 | 0.2 | 97 | 760 | 770 | H |
|  | 20 | 5400 | 600 | 0.11 | 98 | 750 | 720 | J > H |
|  | 21 | 2800 | 840 | 0.3 | 97 | 920 | 800 | J > H > L |
|  | 22 | 2800 | 620 | 0.22 | 98 | 740 | 700 | J |
|  | 23 | 5400 | 270 | 0.05 | 96*2 | 750*2 | 730*2 | H > L*2 |
|  | 24 | 2800 | 680 | 0.24 | 99 | 800 | 790 | J > H |
| Comparative | 8 | 2800 | 980 | 0.35 | 90 | 700 | 490 | H |
| Example | 9 | 2800 | 1540 | 0.55 | 91 | 620 | 580 | H > S |
|  | 10 | 5400 | 2600 | 0.48 | 87 | 480 | 420 | K > H |
|  | 11 | 5400 | 270 | 0.05 | 99 | 520 | 500 | H |

*1 After heat treatment of 1,300° C. × 3 hr in air.
*2 After heat treatment of 1,400° C. × 1 hr in air.
*3 wt % based on the total of silicon nitride and rare earth element oxides.

As is clear from Tables 1 and 2, the sintered materials of Examples 1-24 obtained by effecting firing with the shaped material filled into a casing in an amount falling in the specified range, give a high strength at high temperatures, which strength is not substantially deteriorated as compared with the room-temperature strength. In contrast the sintered materials of Comparative Examples 1-11 obtained by effecting firing with the shaped material filled into a casing in an amount not falling in the specified range, give a high-temperature strength which is significantly deteriorated as compared with the room-temperature strength.

As described in detail above, in the present process for producing a silicon nitride sintered material, a Si3N4 powder containing desired rare earth element oxides is mixed with carbides; the mixture is made into a shaped material; the shaped material is filled into a casing in a specified amount and fired in a nitrogen atmosphere to give rise to crystallization; thereby, a sintered material can be obtained in which the grain boundary phase between Si3N4 grains is substantially a crystalline phase and which has a high strength about equal to the room-temperature strength, even at high temperatures.

What is claimed is:

1. A process for producing a silicon nitride sintered material, which comprises: mixing raw materials consisting essentially of a silicon nitride powder, powders of rare earth element oxides and powders of carbides; shaping the resulting mixture to obtain a shaped material; and firing the shaped material in a casing in a nitrogen atmosphere of 1,700°-2,100° C. under the conditions specified by the following formula:

$$(0.025x - 0.05) < y \leq 0.1x$$

wherein x is a firing time, in hours, and y is the weight, in grams, of shaped material to be filled into the casing divided by the internal volume, in cubic centimeters, of the casing.

2. A process according to claim 1, which further comprises subjecting the sintered material to a heat treatment in air at a temperature of 1,000°-1,500° C. to form, on the surface of the sintered material, a surface layer of 5-100 μm consisting of rare earth element silicate oxides and silicate oxides.

3. A process according to claim 1, wherein the rare earth element oxides in the raw materials are present in an amount of 6-21% by weight.

4. A process according to claim 1, wherein the oxygen silicon nitride powder has an oxygen content of 1-3% by weight.

5. A process according to claim 1, wherein the carbides in the raw materials is 0.1-11% by weight based on the total weight of the silicon nitride and the rare earth element oxides.

6. A process according to claim 1, wherein the powders of rare earth element oxides comprise at least one oxide selected from the group consisting of $Y_2O_3$ and $Yb_2O_3$.

* * * * *